March 6, 1962  R. C. HOWARD ETAL  3,024,181
FUEL ELEMENT
Filed Oct. 30, 1959  2 Sheets-Sheet 1
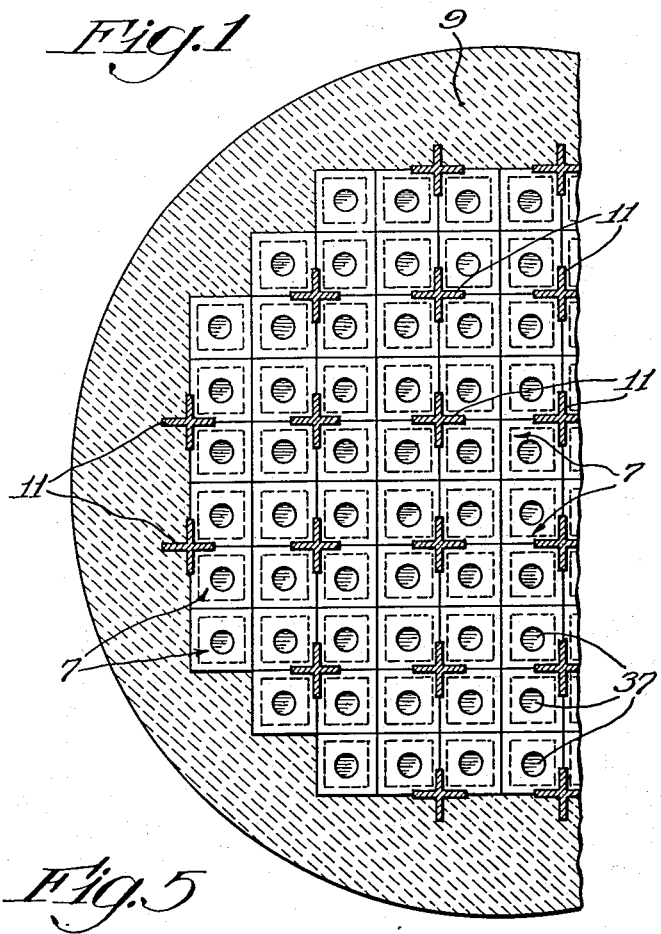
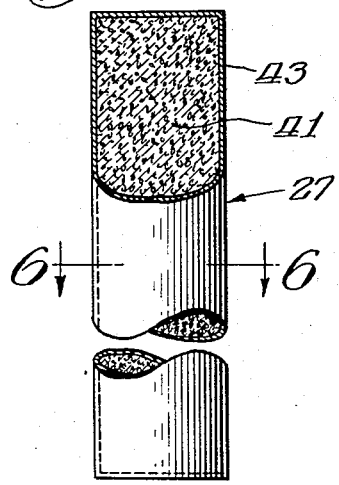
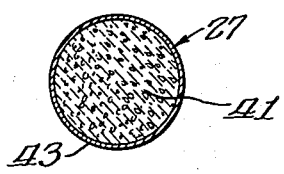
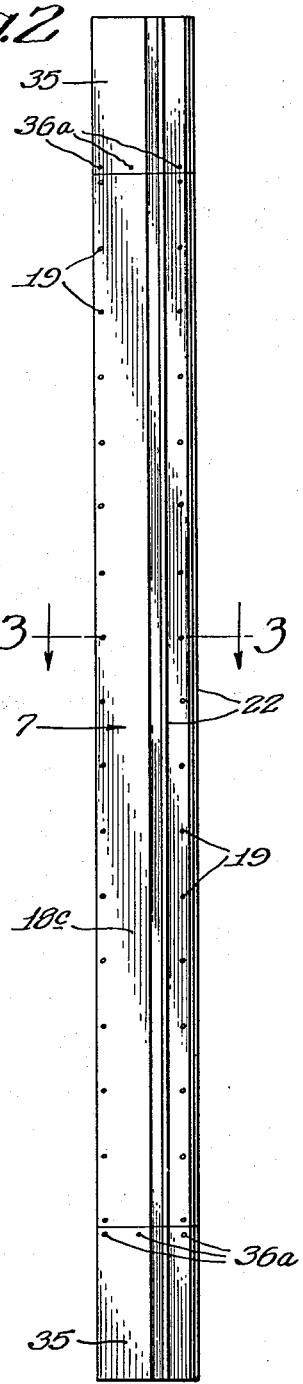
Inventor.
ROBERT C. HOWARD
JACK C. BOKROS
ATTORNEY

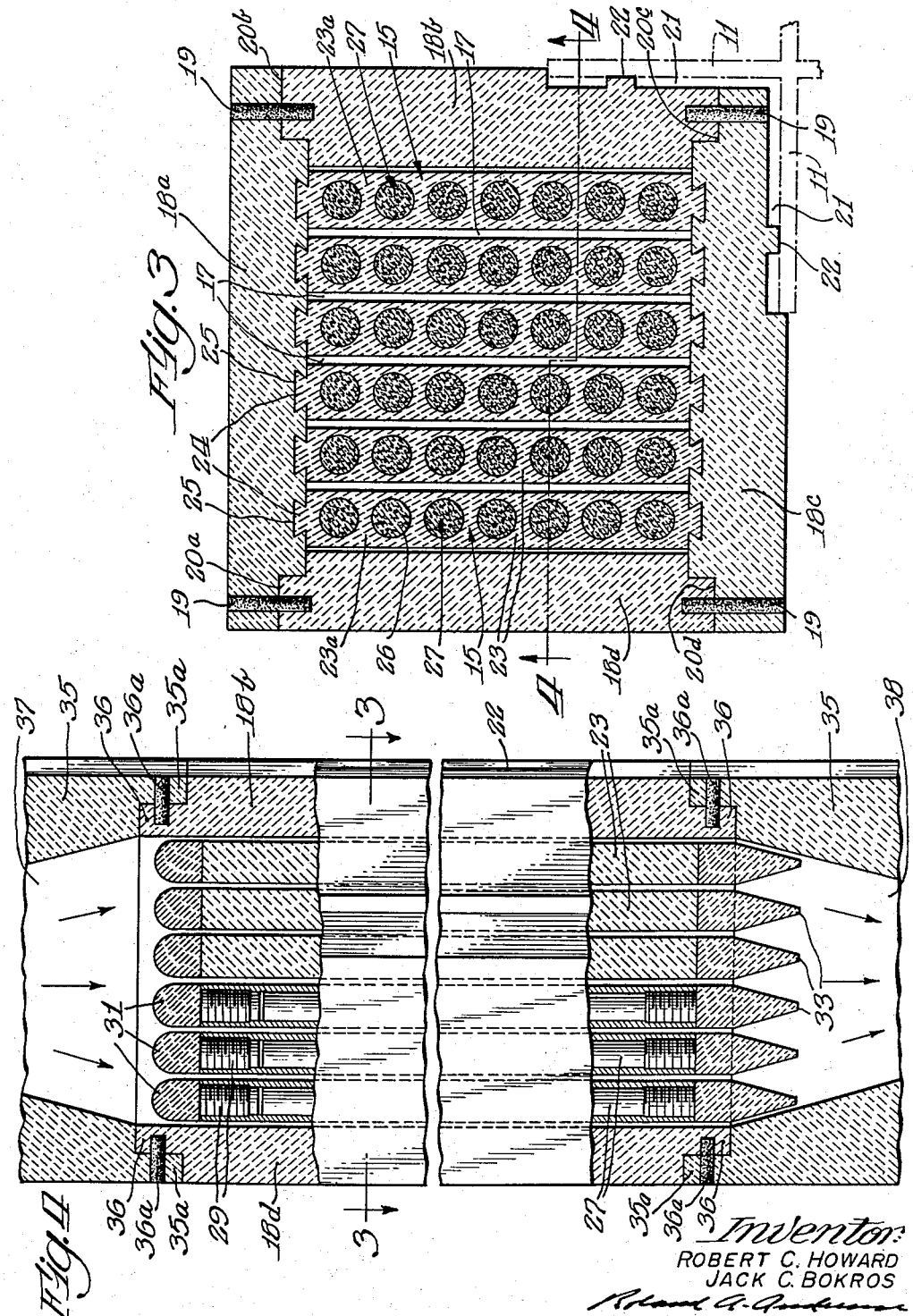

United States Patent Office 3,024,181
Patented Mar. 6, 1962

3,024,181
FUEL ELEMENT
Robert C. Howard, San Diego, and Jack C. Bokros, Encinitas, Calif., assignors to the United States of America as represented by the United States Atomic Energy Commission
Filed Oct. 30, 1959, Ser. No. 850,006
6 Claims. (Cl. 204—193.2)

The present invention relates to an improved fuel element for a nuclear reactor and, more particularly, to a fuel element which is especially adapted for use in a high temperature, gas cooled reactor as well as to an improved method of minimizing fission product migration in such a fuel element.

In high temperature, gas cooled reactors the use of the usual metallic clad fuel elements presents a number of serious problems. In a reactor of this type, a gaseous coolant compatible with the exposed surfaces contacted, e.g., helium, carbon dioxide, etc., is maintained at a relatively high pressure and is circulated around the fuel elements in the reactor core. In the event that the flow of coolant is interrupted, the heat produced by the core is absorbed by the core itself and its temperature rises until the control rods are operated to decrease the output of the core and emergency cooling is instituted. When the usual metallic clad fuel elements are employed, the thermal capacity of the element is exceedingly small and, as a result, any interruption in the flow of coolant will almost immediately result in rapid heating of the fuel element and safe temperature limits may be exceeded before emergency cooling measures are completed. Also, the use of a high pressure gas coolant also requires relatively heavy cladding of the fuel elements to prevent mechanical failure of the cladding due to the pressures involved. Of course, if the cladding is ruptured, the fission products will escape from the fuel element and contaminate the system. The provision of heavy metallic cladding on the fuel elements also presents the usual problems resulting from expansion and contraction of the metal over the temperature range of the core.

Theoretically, a desirable core for a high temperature gas cooled reactor is a solid homogeneous core. In a construction of that type, a homogeneous mixture of the fuel with a large mass of a moderator would be formed into shapes which would provide optimum heat transfer and the gas coolant would be circulated around the shapes. In the event of an interruption in the supply of coolant, the thermal capacity of the mass of moderator and fuel would be great enough to maintain the temperature rise within safe limits over the period of time that is required to control the reactor with the control rods. The construction presents a number of problems in connection with the escape of fission products.

A further problem is the operation of reactors at optimum efficiencies in the production of utilizable power. It is obvious that the higher the temperature of operation, the more efficient the utilization of power. However, materials and constructions now in use, especially when carbon is present in the system, are not entirely practical at temperatures of over about 1500° F. since the usual metals employed in construction of fuel element assemblages tend to carburize and lose strength at these temperatures.

The principal object of the present invention is the provision of an improved fuel element for nuclear reactors and, more particularly, for gas cooled, high temperature reactors. Another object of the invention is the provision of a fuel element for a nuclear reactor having improved heat transfer and safety characteristics. It is also an object of the invention to provide an improved fuel element which combines the heat transfer and safety characteristics of the homogeneous type of fuel element with the fission product retention characteristics of the metallic clad type of fuel elment. A further object of the invention is the provision of an improved fuel unit assemblage of fuel elements which is especially adapted for use in a high temperature gas cooled reactor at temperatures above 1500° F.

Additional objects of the invention include the provision of improved materials for controlling the migration of fission products in a reactor operated at temperatures above 1500° F., as well as the provision of an improved method of minimizing fission product migration without materially interfering with the heat transfer characteristics of the unit.

Other objects and advantages of the invention will become known by reference to the drawings and to the following description.

In the drawings:

FIGURE 1 is a horizontal sectional view, partially broken away, of a reactor core having fuel elements which embody various of the features of this invention, the view being taken in a place above the fuel elements but below the upper end of the control rods;

FIGURE 2 is an elevational view of one of the fuel elements which make up the reactor core of FIGURE 1;

FIGURE 3 is a sectional view taken along line 3—3 in FIGURE 2;

FIGURE 4 is an enlarged sectional view of the fuel element shown in FIGURE 2, the section being taken along line 4—4 in FIGURE 3;

FIGURE 5 is a fragmentary view of one of the fuel rods which constitutes a part of the fuel element shown in the other figures of the drawings; and FIGURE 6 is a sectional view taken on line 6—6 in FIGURE 5.

Basically, the production of a fuel element in accordance with the invention involves dispersing small fuel compacts contained in a thin and relatively fragile sheath of metal throughout a carrier body. The carrier body is adapted to supplement the thin metal sheath of the fuel compact so as to provide mechanical strength and the carrier body is shaped to provide optimum heat transfer to the coolant. The ratio of mass of the carrier body to that of the fuel compacts is chosen to provide the desired thermal capacity for the unit and the desired amount of reinforcement for the metal sheath.

In a fuel element constructed in the manner described, the heat generated by the fuel compact is transmitted through its thin metal sheath to the large mass of the carrier body which, in turn, transfers the heat to the coolant which is circulated over the surface of the carrier body. It will, therefore, be seen that the carrier body may be fabricated in such a shape as to provide most efficient heat transfer characteristics and, at the same time, in the event that the flow of coolant is interrupted the large mass of carrier body will be heated by the fuel compacts, but because of its mass, the rate of temperature rise will be slow enough so that the control and emergency cooling systems for the reactor can operate to reduce the heat output of the unit before safe temperature limits are exceeded.

Referring now to the drawings, a horizontal cross-section of a reactor core which embodies various of the features of this invention is shown in FIGURE 1. The core includes a plurality of fuel units 7, each of which are square in cross-section and which are supported within a suitable reflector 9. Suitable thermal shields and a pressure vessel (not shown) are disposed about the reflector. Vertically movable control rods 11 of cruciform cross-section are disposed at the corners of alternate fuel units so as to effect the desired control of the reactor. A coolant gas, such as helium, is adapted to be circulated through the fuel units so as to effect cooling of the core and removal of the heat generated by the fuel.

As will be pointed out, each of the fuel units 7 includes an elongated outer fuel shell or fuel box 13 having openings at each end so that the coolant can be circulated through the box 13. Within the box 13 there are provided a plurality of fuel elements 15 which embody various features of the invention. The fuel elements 15, illustrated, are in plate form and are disposed in parallel planes within the box 13, channels 17 being provided between the fuel elements 15 through which the coolant is circulated.

The fuel box and the fuel plates may be constructed of any one of a number of types of solid moderator materials. Examples of material which may be employed are graphite, beryllia, zirconium hydride, etc. However, because of the relative ease of fabrication, reactor grade graphite is preferred as the constructional material for the fuel box and the fuel plates.

As has been pointed out, the fuel box 13 is in the form of an elongated tube. It may be fabricated in any convenient manner. In the illustrated embodiment, the box 13 is fabricated from four longitudinally extending slabs 18a, 18b, 18c, and 18d, which are attached together by means of pins 19 fabricated from moderator or other suitable material. As shown in FIGURE 3, each of the junctures between slabs 18a, b, c, and d, are rabbeted as shown at 20a, b, c, and d, to facilitate interconnection between the slabs.

In the construction illustrated in the drawings, the tube is square in cross-sectional outline (FIGURE 3) except that on one corner the outer surface of the tube is cut away on the surface of adjoining slabs 18b and 18c to provide a longitudinally extending recess 21 for receiving the cruciform-shaped control rod 11. In order to reduce friction between the control rod 11 and the walls of the fuel box 13, a longitudinally extending bearing rib or rub bar 22 is provided on the outer face of the fuel box 13 in each of the recesses 21. As will be seen in FIGURES 1 and 3, when four of the fuel units 7 are placed together with the recesses 21 properly oriented, the four recesses define a longitudinally extending channel between the fuel boxes for receiving the control rod 11. The faces of the control rod 11 bear on the ribs 22 with a sliding contact and are free to move longitudinally of the fuel boxes 13.

The fuel elements 15, as has been pointed out, are in the form of elongated plates 23 which are adapted to support the fuel compacts and which are spaced apart to provide channels 17 for the coolant. As illustrated, the plates 23 are arranged in parallel planes. As is shown in FIGURES 3 and 4, the fuel plates 23 extend substantially the entire length of the fuel box 13 and are supported in the fuel box. In order to position the fuel plates 23 and maintain their spacing in the fuel box 13, the longitudinally extending edges of each of the fuel plates are shaped to provide a key 24 which fits into a mating keyway 25 in the inner surface of the fuel box 13. After the fuel plate 23 is inserted in the fuel box 13, it may be suitably secured in position, as by locking pins (not shown).

Each of the fuel plates 23 in the illustrated structure is provided with a series of spaced apart passageways 26 which extend the entire length of the plate. The fuel compacts, which will hereinafter be described in greater detail, are fabricated in the form of elongated rods 27 which are adapted to fit closely within the passageways 26. Each end of each of the passageways is then suitably closed with a threaded sealing plug 29.

At the end of the fuel unit at which the coolant is to be admitted, caps 31 are provided for each of the fuel plates 23 to minimize eddy currents and interference with the flow of coolant. As shown in FIGURE 4, the caps 31 for the fuel plates at the inlet end of the fuel unit extend across the end of each of the plates 23 and are arcuate in cross-section to minimize interference with the flow of coolant. At the outlet end of the fuel unit, each of the plates 23 are provided with tail caps 33 which are adapted to streamline the ends of the plates so as to minimize interference with coolant flow. The tail caps 33 illustrated are V-shaped in cross-section and extend across the end of the plate.

In order to adjust the flow through each of the fuel units 7, a throttling orifice member 35 is provided at each end of the fuel box 13. As is shown in FIGURE 4, the members 35 are generally square in outline and have an outer surface which corresponds in shape to the outer shape of the fuel box 13 so as to provide an extension thereof. Each of the members 35 includes an internal passageway 36 which changes the shape of the flow path from the square path provided adjacent the ends of the plates 21 to circular inlet and outlet openings 37 and 38, respectively. By varying the area of the inlet and outlet openings the flow of coolant through each individual fuel unit 7 in the reactor core may be adjusted. Also, by forming the members 35 with relatively small outlet and inlet openings, as illustrated, the members 35 provide a mass of material at each end of the fuel units, which masses serve as the upper and lower reflector for the reactor core.

The end member 35 which connects to the slabs 18a, b, c, and d, and the ends of the slabs are both provided with rabbets 35a and 36, respectively, so that the members 35 serve to maintain the slabs 18a, b, c, and d locked together. The members 35 are suitably secured to the slabs 18 as by means of pins 36a.

The fuel compacts may be fabricated from any fuel material which does not excessively expand under irradiation. Examples of fuel materials which are acceptable are uranium dioxide ($UO_2$), uranium dioxide ($UO_2$) diluted with beryllium oxide (BeO), uranium dioxide ($UO_2$) diluted with aluminum oxide ($Al_2O_3$), uranium carbide (UC) diluted with carbon (C), uranium dicarbide ($UC_2$) diluted with carbon (C), or uranium dioxide ($UO_2$) diluted with carbon (C).

The fuel compacts for insertion into the passageway in the fuel plates are formed into rods of small diameter of the order of .25 to .50 inch and preferably are long enough to extend substantially the entire length of the passageway 26 in the fuel plate 23. In any event, the cross-sectional area of the individual fuel rods is substantially less than the cross-sectional area of the fuel plate 23.

Each of the fuel rods 27 (FIGURES 5 and 6) includes an elongated rod of nuclear fuel material 41 which is encased in a sheath 43 of metal which will provide a barrier for fission products under the conditions within the reactor. If a substantial amount of carbon is not present in either the fuel material, the fuel plate, or in the atmosphere within the reactor, the metal sheath may be fabricated from a number of materials. Suitable metals which may be employed for temperatures up to 1700° C. include chrome plated stainless steels, ferritic stainless steels, and nickel and nickel alloys.

In the event that carbon is present in appreciable quantities within the system, the metal used for the fuel compact sheath should be a metal which resists carburization. Nickel, and certain nickel-based alloys are especially suited for use when carbon or graphite is present. Nickel shows little attack by graphite at temperatures up to 1700° F. and it has been found that "A" nickel and "Z" nickel are extremely satisfactory for use in sheaths for fuel compacts constructed in accordance with the teachings of this invention. However, nickel absorbs carbon at high temperatures, e.g., in the range of about 1700° F. and when the nickel is cooled, particles of carbon precipitate in the nickel structure. As a result, low temperature (1200° F.) aging of nickel which has been exposed to carbon at higher temperatures results in a reduction in hardness and strength. Despite these reductions in hardness and strength, nickel, and "A" nickel and "Z" nickel alloys are suitable for use in fabricating the sheaths.

It has been discovered that the tendency of the nickel to exhibit reduced strength and hardness upon low temperature aging may be substantially reduced by incorporating in the nickel over about 28% of copper. The addition of the copper minimizes the deposition of carbon in strength reducing configurations. The addition of more than 28% copper to the nickel tends to reduce the carbon absorption of the nickel but does not reduce the change in hardness to any appreciably greater degree than 28% copper. The greater the percentage of copper, the greater the coefficient of expansion of the alloy and also increased amounts of copper progressively lower the melting point. A permissible range of copper, from about 28 to 33%, results in marked reductions in changes in hardness and strength upon low temperature aging and, at the same time, not excessively reduce the melting point or excessively increase the coefficient of expansion. Other elements may be present in minor amounts up to a total of about 5% by weight in addition to the nickel and copper so long as these elements do not adversely affect the properties of the nickel-copper alloy.

One commercial alloy which meets these specifications is the alloy known as Monel metal. Monel is a nickel-copper alloy containing 67% nickel, .15% carbon, 1.0% manganese, .01% sulphur, .1% silicon, 1.4% iron, and the balance copper.

In order to obtain most efficient operation the sheathing material 43 for the fuel rod should desirably be thin enough so that it will conform either to the shape of the passageway 26 or to the shape of the fuel compact or body 27, depending upon the pressure gradients obtaining in the structure. Thus, in operation with a high pressure coolant, the pressure of the coolant under normal conditions will be much greater than the pressure developed by fission products within the sheath, and the sheath will conform closely to the shape of the fuel body and be forced into intimate contact therewith by the pressure of the coolant. On the other hand, if pressure is lost on the coolant or the pressure developed by the fission products is excessively high, the sheath will be forced into intimate contact with the walls of the passageway. Thus, it will be seen that the mechanical pressure on the sheath is borne by either the walls of the passageway 26 or the surface of the fuel body so that the strength characteristics of the sheath material are not controlling. It must be borne in mind, however, that the sheath should be continuous so that it should not be so thin that flaws or imperfections will appear which will permit the diffusion of fission products therethrough. Satisfactory ranges of thickness have been found to be in the order of .005 to .020 inch. Thicknesses in the range provide for an intimate force-contact between the fuel compact or the walls of the passageway 26 at operating temperatures and also provide a satisfactory diffusion barrier for fission products.

The clearance between the walls of the passageway 26 and the fuel element preferably is carefully controlled. The fuel rods with their cladding should preferably be proportioned to result, at operating temperatures, in a mean annular gap of 0.002 inch ±0.001 inch at operating temperatures. The mechanical strength of the graphite or fuel body then resists the pressure of the fission products or coolant, and the metal cladding which is thin enough to be entirely supported by its carrier serves only as a diffusion barrier. This construction results in extremely good thermal performance since the heat from the fuel rod is transferred substantially directly to the fuel plate whose heat radiating surface includes a large radiation area. Also, in the event that the flow of coolant is interrupted, the heat output of the fuel rod must heat up the entire plate, thereby greatly inncreasing the thermal capacity of the system before excessive temperatures are reached.

As an aid to understanding the invention, the following is an example of a typical reactor core having a power output of 54 megawatts which may be constructed embodying the principles of the invention. The fuel unit to be described is adapted to be operated at a mean operating temperature on the surface of the fuel plates of about 1500° F. at the power output referred to. The unit is adapted to be cooled with helium having an inlet temperature of about 750° F. and an outlet temperature of about 1300° F. The fuel employed is uranium carbide dispersed in graphite, the fuel being formed into rods 76.44 inches long and 0.5 inch in diameter. Each rod is initially loaded with .7 grams of uranium (20 percent enriched) as uranium carbide per cubic centimeter of fuel material. The rod is clad with a Monel metal sheath having a thickness of .010 inch. The clearance between the fuel rod and the sheath at room temperature is about .001 inch.

Seven of the clad fuel rods are disposed in a graphite fuel plate having a thickness of .720 inch and a width of 5.0 inches. The fuel rods are uniformly disposed in the manner shown in FIGURE 3. Six plates are supported within a graphite fuel box 86 inches long. The fuel box 13 has a wall thickness of approximately 1 inch and in overall cross-section measures 7.25 inches to the side. The fuel plates are supported within the fuel box with a spacing of .113 inch between adjacent plates and, in the case of the outside plates (the plates 21a in FIGURE 3), the spacing between the wall of the fuel box and the plate is .0575 inch. The diameter of the passageways into which the fuel rods are inserted is 0.51 to ±.001 inch at room temperature, and at mean operating temperatures of about 1500° F. the clearance between the fuel body and the walls of the passageway is calculated to be .002 inch. The core of the reactor includes 88 of the fuel boxes as described above. The reflector surrounding the core is fabricated from graphite or other suitable material.

While the foregoing describes one specific embodiment of the invention, the particular shape of the carrier body or fuel plate may be varied depending upon the reactor parameters and the heat transfer characteristics which are desired. For example, short fuel rods may be disposed in fuel plates, the rods being disposed transversely to the line of flow of the coolant. Rather than supporting the fuel rod in a flat plate of moderator material, the moderator material may be fabricated in any desired shape. For example, the moderator may be in the shape of a hexagonal bar carrying in its interior a number of fuel rods. The hexagonal bars of moderator material may be assembled with suitable spacers to provide channels for coolant flow. Similarly, the moderator or carrier may be in the form of a tube of either circular or other cross-section, and the fuel bodies may be disposed in the walls longitudinally thereof, and a number of tubes of different size, each carrying fuel bodies, may be arranged in nested relation with suitable spacers so as to provide passageways for the coolant.

A fuel element of the type described exhibits the desirable qualities of a homogeneous type of fuel element, that is, it has excellent heat transfer characteristics, and, in addition, provides a high measure of safety because of the large thermal capacity of the fuel element itself. Moreover, the element also exhibits the fission product retention characteristics of a metallic-clad heterogeneous type of fuel element.

Various features of the invention believed to be new are set forth in the appended claims.

We claim:

1. A fuel element for operation at temperatures over about 1500° F. in a nuclear reactor, comprising a nuclear fuel body containing uncombined carbon clad in a continuous, metallic sheath of a metal consisting essentially of nickel containing over about 28 percent by weight of copper.

2. A fuel element for operation at temperatures over about 1500° F. in a nuclear reactor, comprising a nuclear fuel body containing uncombined carbon clad in a continuous, metallic sheath of a metal consisting essentially of nickel containing between about 28 and 33 percent by weight of copper.

3. A fuel element for operation at temperatures over about 1500° F. in a nuclear reactor, comprising a body of graphite, a passageway in said graphite, and a nuclear fuel body containing uncombined carbon, said fuel body being supported in said passageway, said fuel body being clad in a continuous, thin metallic sheath of a metal comprising nickel containing over about 28 percent by weight of copper.

4. A fuel element for operation at temperatures over about 1500° F. in a nuclear reactor, comprising a body of graphite, a passageway in said graphite, and a nuclear fuel body containing uncombined carbon, said fuel body being supported in said passageway, said fuel body being clad in a continuous, thin metallic sheath of a metal comprising nickel containing between about 28 and 33 percent by weight of copper.

5. A fuel element for operation at temperatures over about 1500° F. in a nuclear reactor, comprising a body of graphite, a passageway in said graphite, and a nuclear fuel body, said fuel body being supported in said passageway, said fuel body being clad in a continuous, thin metallic sheath less than .02 inch in thickness of a metal comprising nickel containing between about 28 and 33 percent by weight of copper, said fuel body and cladding being adapted to fit in close tolerance with at least a portion of said passageway within said body of graphite.

6. A fuel element for operation at temperatures over about 1500° F. in a nuclear reactor, comprising a body of graphite, a passageway in said graphite, and a nuclear fuel body, said fuel body being supported in said passageway, said fuel body being clad in a continuous, thin metallic sheath less than about .02 inch in thickness of a metal comprising nickel containing between about 28 and 33 percent by weight of copper, said fuel body and cladding being adapted to fit with a tolerance of 0.003 inch with at least a portion of said body of graphite.

References Cited in the file of this patent

UNITED STATES PATENTS

| | | |
|---|---|---|
| 2,854,737 | Gray | Oct. 7, 1958 |
| 2,854,738 | Gray | Oct. 7, 1958 |
| 2,871,558 | Colbeck | Feb. 3, 1959 |